Patented Oct. 11, 1932

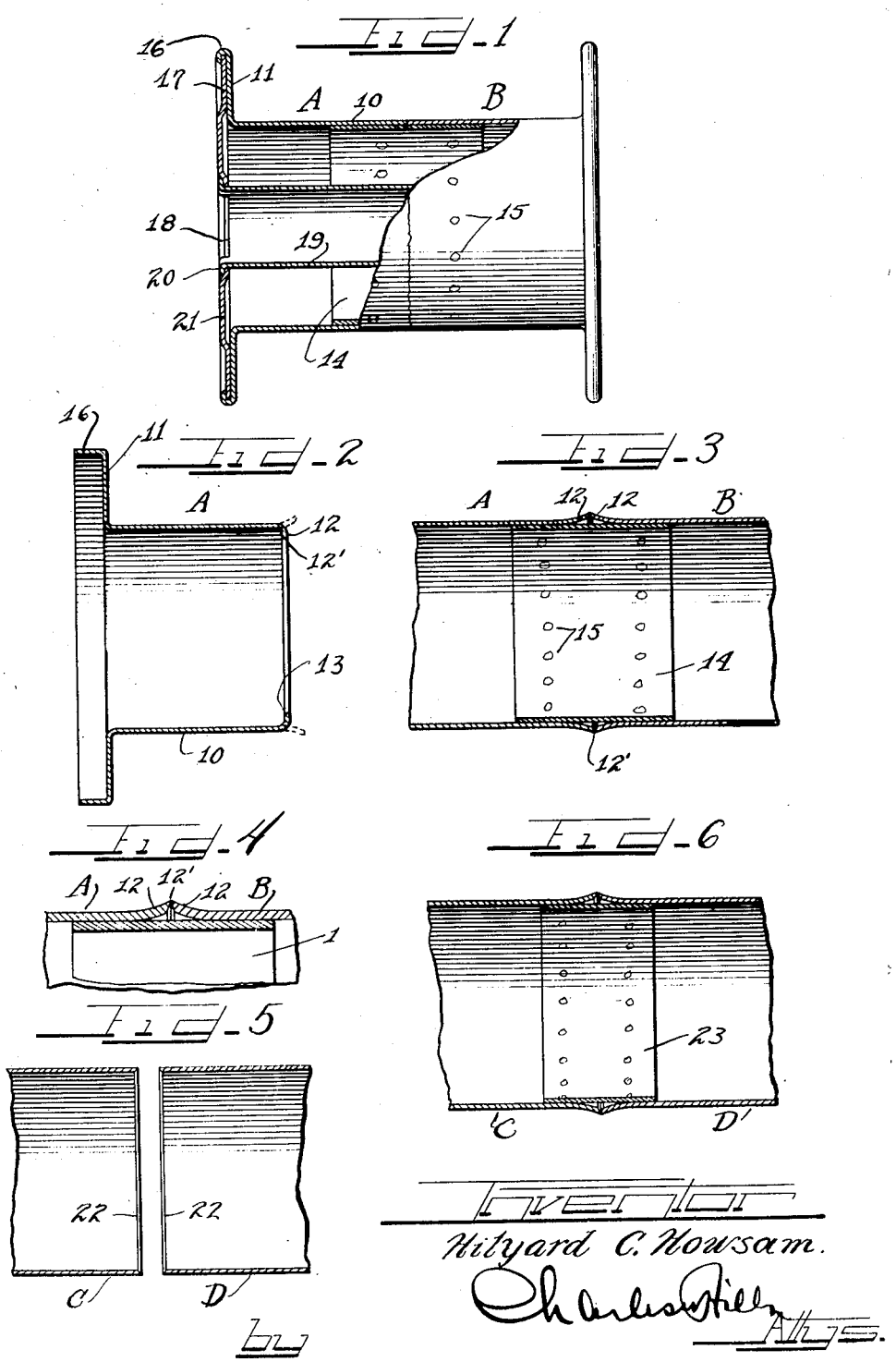

1,881,596

UNITED STATES PATENT OFFICE

HILYARD C. HOWSAM, OF CHICAGO, ILLINOIS, ASSIGNOR TO HUBBARD SPOOL COMPANY, OF CHICAGO, ILLINOIS, A CORPORATION OF ILLINOIS

SPOOL OR REEL

Application filed October 26, 1931. Serial No. 571,070.

This invention relates to the construction of sheet metal spools and reels and involves particularly an improved method and procedure for securing together the adjacent ends of sheet metal tubular sections, as, for example, the tubular sections forming the barrel of a sheet metal spool, so that the resulting joint or seam will present a smooth, unbroken cylindrical surface entirely free of crevices, openings, or projections in which material such as fine threads or fine wires might wedge or be held.

Where the edges of tubular members are abutted directly together, skillful manipulation is required of the welding flame or machine and after the welding the joint must be ground down to insure a smooth uniform surface.

The object of the invention is to provide an improved procedure for joining two tubular members end to end without direct welding but by intimately merging the metal at the ends of the sections or tubular members to form an intimate jointure. In accordance with my invention, the ends of the tubular sections to be joined are first flared a distance outwardly and a tie ring is inserted to which the sections are welded or otherwise secured at points inwardly of the flared ends and with the edges of the flared ends in abutting engagement, whereafter the flared ends are rolled or otherwise deflected radially inwardly against the tie ring to form a cylindrical outer surface, the metal at the ends of the sections being intimately merged together during such inward deflection or rolling step.

Referring to the drawing:

Figure 1 is a side elevation partly in diametral section of a sheet metal spool or reel, constructed in accordance with my invention;

Figure 2 shows one of the sheet metal halves from which the spool body is to be formed and the manner of preparing the flared inner ends thereof;

Figure 3 is a diametral section of the spool body sections to be joined showing the tie ring and the abutting flared ends of the sections;

Figure 4 is an enlarged sectional view to more clearly illustrate the operation;

Figure 5 is a diametral section of the ends of two tubular members showing another manner of preparing the edges for joining; and Fig. 6 shows the members of Figure 5 flared and secured to a tie ring ready for the rolling and finishing operation.

In Figures 1, 2 and 3 I have shown my improved joint applied to a sheet metal spool for supporting fine threads, wires, or the like. The spool body is formed of two halves A and B each comprising a cylindrical hub section 10 and an end disc or head 11 which may be in a plane at right angles with the hub. Each body half is primarily formed by deflecting a disc of sheet metal to cup shape whose bottom is then punched out to leave the annular internal flange 12. In die operations of this kind, the die member opening is of larger diameter than the diameter of the punch member and when the die is applied on the inside of the half and the punch at the outside thereof, the edge 13 around the hole left after the die operation will be chamfered or beveled, its smaller diameter being on the outside. After the punching operation, the flange 12 is deflected outwardly and slightly flared as indicated by dotted lines in Figure 2 and by full lines in Figure 3, Figure 4 being to an enlarged scale to more clearly show this flanging. The two halves A and B are now axially aligned with the outer edges 12' of the beveled ends in abutting engagement as shown in Figures 3 and 4 and a cylindrical sheet metal tie ring 14 is inserted in the halves to accurately align them and the halves are then rigidly secured to the tie ring as by spot welding indicated by 15. Instead of spot welding between welding points of a welding machine, the welding points could be in the form of rollers so that the halves and tie member would be welded together along zones. The welding is outside of the flared or gabled engaging ends of the halves and after the welding operation the flared or gabled sections are bumped or rolled down against the cylindrical tie sleeve 14, and during such bumping or rolling operation the edges 12′, which are more or less jagged, will be intimately forced into interengagement to form a tight joint or seam which leaves no crevices or openings in which thread or wire might wedge or become caught, the entire outer surface of the spool barrel being then as cylindrical and smooth as though the barrel had been made from a single piece of sheet metal. On the form of spool shown, each embryo half has a cylindrical flange 16 extending outwardly from the periphery of the end disc or head 11 and after the halves have been secured together in the manner described, a reinforcing end plate 17 is applied to the head within the flange 16 and this flange is then curled around the periphery of the reinforcing plate as indicated in Figure 1, and substantially between the flange and the hub section the reinforcing plate may be in intimate contact with the head and secured thereto as by spot welding. Each reinforcing washer may have a central opening 18 for receiving the outer end of a core tube 19 whose outer end sections 20 are deflected laterally against the outer face of the respective reinforcing plate. The intermediate sections 21 of the reinforcing plates may be deflected outwardly with their outer faces in alignment with the outer edges of the curled over flanges 16 so that adequate seating surfaces are provided for the ends of the spool.

My improved jointure could be utilized efficiently for intimately joining together two tubular sheet metal sections C and D as shown in Figures 5 and 6. Where intimate interengagement and merging together of the ends of the sections is desired, such ends may be chamfered or beveled by means of a suitable tool, as indicated at 22 (Figure 5) and then, as shown in Figure 6, a cylindrical sheet metal tie means 23 is inserted to align the sections after the ends thereof have been flared outwardly, the sections being then secured to the tie sleeve as by welding and the flared or gabled ends are then rolled down to force the beveled ends of the sections into intimate interengagement with the outer surfaces thereof cylindrical and smooth. Where intimate interengagement is not necessary, the sections to be joined need not be beveled but are merely flared outwardly and the flared edges are then brought together over the tie ring, the sections welded to the ring, and then the flared sections rolled down into cylindrical form.

The angle of bevel and the angle of flare are preferably such that during the rolling operation the metal along the corners of the abutting beveled ends will be forced into interengagement to form a tight closed joint and any surplus metal will be forced downwardly between the larger diameter sections of the beveled edges to fill in between the edges so that after the rolling operation the joined edges will be in full engagement throughout, as indicated in Figure 1.

By my improved method, tube sections, as for example, the tubular sections of a spool barrel, may be easily and efficiently secured together end to end so as to present a smooth, cylindrical outer material receiving surface which is free from crevices and openings or any projections which might wedge, clamp or injure the supported material such as fine thread, yarn or wire. By forming the end sections of the spool body with the end flanges or heads integral with the hub sections, the corners of the spool will be continuous and will present smooth, unbroken material receiving surfaces.

I do not desire to be limited to the precise construction and procedure referred to as modifications are possible within the scope of the appended claims.

I claim as follows:

1. The method of forming a sheet metal spool which consists in forming from sheet metal two cup-shaped halves each comprising a cylindrical body part and a head at its outer end, then removing the bottoms of the cup-shaped halves and flaring the resulting edges outwardly, then securing an aligning member to the halves to hold the flared ends thereof with their edges abutting, and then deflecting the flared ends against the aligning member.

2. The method of constructing a sheet metal spool body which consists in forming integral from sheet metal two similar halves each comprising a hub section and an end disc at its outer end, then flaring outwardly the inner ends of the hub sections of said halves, then inserting a cylindrical sheet metal tie member in said halves and securing said halves thereto in axial alignment with each other and with their flared ends abutting, and then rolling down the flared ends against said tie member.

In testimony whereof I have hereunto subscribed my name at Chicago, Cook County, Illinois.

HILYARD C. HOWSAM.